(12) United States Patent
Sato et al.

(10) Patent No.: US 12,456,586 B2
(45) Date of Patent: Oct. 28, 2025

(54) ELECTROLYTIC CAPACITOR

(71) Applicant: Panasonic Intellectual Property Management Co., Ltd., Osaka (JP)

(72) Inventors: Kenta Sato, Osaka (JP); Toshifumi Kadokawa, Osaka (JP); Junichi Kurita, Osaka (JP); Daisuke Kubo, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 126 days.

(21) Appl. No.: 18/259,790

(22) PCT Filed: Jan. 25, 2022

(86) PCT No.: PCT/JP2022/002657
§ 371 (c)(1),
(2) Date: Jun. 29, 2023

(87) PCT Pub. No.: WO2022/163645
PCT Pub. Date: Aug. 4, 2022

(65) Prior Publication Data
US 2024/0087817 A1    Mar. 14, 2024

(30) Foreign Application Priority Data

Jan. 29, 2021 (JP) ................. 2021-013408

(51) Int. Cl.
*H01G 9/012* (2006.01)
*H01G 9/15* (2006.01)

(52) U.S. Cl.
CPC ................. *H01G 9/012* (2013.01)

(58) Field of Classification Search
CPC ........ H01G 9/012; H01G 4/30; H01G 9/0425; H01G 9/048; H01G 9/08; H01G 9/10; H01G 9/15; H01G 4/232; H01G 9/008
See application file for complete search history.

(56) References Cited

U.S. PATENT DOCUMENTS

| 2002/0001169 A1* | 1/2002 | Shiraishi .................. H01G 9/26 |
| | | 361/523 |
| 2020/0194187 A1* | 6/2020 | Kumakawa .............. H01G 9/08 |

(Continued)

FOREIGN PATENT DOCUMENTS

| JP | 2002-319522 | 10/2002 |
| JP | 2006-100295 | 4/2006 |

(Continued)

OTHER PUBLICATIONS

International Search Report of PCT application No. PCT/JP2022/002657 dated Apr. 26, 2022.

*Primary Examiner* — Dion R. Ferguson
(74) *Attorney, Agent, or Firm* — Rimon P.C.

(57) ABSTRACT

An electrolytic capacitor includes a capacitor element that includes an anode part and a cathode part, an exterior body that seals the capacitor element, a first external electrode that is electrically connected to the anode part, and a second external electrode that is electrically connected to the cathode part. At least one of an end face of the anode part or an end face of the cathode part is exposed from the exterior body to be electrically connected to a corresponding one of the first external electrode or the second external electrode. The end face exposed from the exterior body is covered with an electroless Ni plating layer, and the electroless Ni plating layer is covered with an electroless Ag plating layer. The electroless Ag plating layer is covered with the corresponding one of the first external electrode or the second external electrode.

20 Claims, 5 Drawing Sheets

(56) References Cited

U.S. PATENT DOCUMENTS

| | | | | |
|---|---|---|---|---|
| 2020/0335284 A1* | 10/2020 | Yamazaki | ............... | H01G 9/07 |
| 2022/0223349 A1* | 7/2022 | Tamatani | ............. | H01G 9/0029 |
| 2022/0223350 A1* | 7/2022 | Aritomi | .................. | H01G 9/15 |
| 2022/0399168 A1* | 12/2022 | Suzuki | .................... | H01G 9/08 |
| 2023/0062760 A1* | 3/2023 | Suzuki | .................... | H01G 9/14 |
| 2024/0087817 A1* | 3/2024 | Sato | ........................ | H01G 4/30 |

FOREIGN PATENT DOCUMENTS

| | | | | |
|---|---|---|---|---|
| JP | 2006-286771 | | 10/2006 | |
| JP | 2020-141059 | | 9/2020 | |
| JP | 2020-173991 | | 10/2020 | |
| JP | 2020-178098 | | 10/2020 | |
| WO | WO-2022163645 A1 * | 8/2022 | ............ | H01G 9/012 |
| WO | WO-2023120383 A1 * | 6/2023 | | |

* cited by examiner

ELECTROLYTIC CAPACITOR

CROSS-REFERENCE TO RELATED APPLICATIONS

This application is a U.S. national stage application of the PCT International Application No. PCT/JP2022/002657 filed on Jan. 25, 2022, which claims the benefit of foreign priority of Japanese patent application No. 2021-013408 filed on Jan. 29, 2021, the contents all of which are incorporated herein by reference.

TECHNICAL FIELD

The present disclosure relates to an electrolytic capacitor.

BACKGROUND

An electrolytic capacitor includes a capacitor element, an exterior body that seals the capacitor element, and external electrodes electrically connected to an anode and a cathode of the capacitor element, respectively. The capacitor element includes an anode body having a first portion (also referred to as an anode lead portion) including a first end and a second portion (also referred to as a cathode forming portion) including a second end, a dielectric layer formed on a surface of at least the second portion of the anode body, and a cathode part covering at least a part of the dielectric layer.

With respect to a method for electrically connecting the anode body to the external electrode, Unexamined Japanese Patent Publication No. 2020-141059 proposes a method including a first external electrode formed on a first end face of a resin molded body and electrically connected to an anode exposed from the first end face, and a second external electrode formed on a second end face of the resin molded body and electrically connected to a cathode exposed from the second end face. The external electrode is electrically connected at the end face of the resin molded body.

SUMMARY

One aspect of the present disclosure relates to an electrolytic capacitor including a capacitor element that includes an anode part and a cathode part, an exterior body that seals the capacitor element, a first external electrode that is electrically connected to the anode part, and a second external electrode that is electrically connected to the cathode part. At least one of an end face of the anode part or an end face of the cathode part is exposed from the exterior body to be electrically connected to a corresponding one of the first external electrode or the second external electrode, the end face exposed from the exterior body is covered with an electroless Ni plating layer. The electroless Ni plating layer is covered with an electroless Ag plating layer, and the electroless Ag plating layer is covered with the corresponding one of the first external electrode or the second external electrode.

Advantageous Effect of Invention

According to the present disclosure, a highly reliable electrolytic capacitor with reduced ESR can be realized.

DESCRIPTION OF EMBODIMENT

Figure 1:
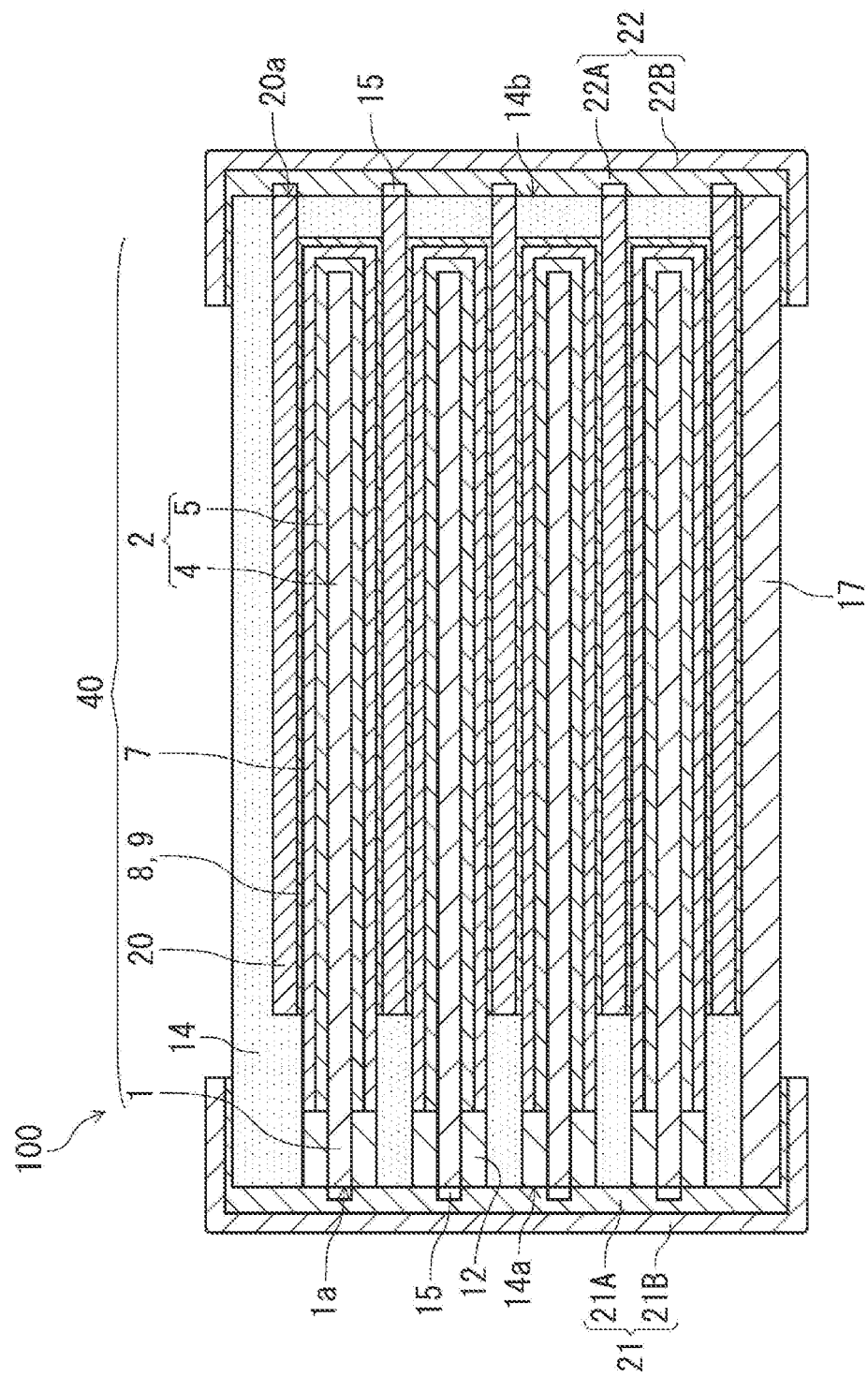
FIG. 1 is a cross-sectional view schematically illustrating an electrolytic capacitor according to an exemplary embodiment of the present disclosure.

Prior to the description of an exemplary embodiment, problems in the related art are briefly described below.

In a solid electrolytic capacitor of the related art, an external electrode includes an inner plating layer, a resin electrode layer, and an outer plating layer. And exposed end faces of an anode and a cathode are covered with an inner plating layer including an electroless Ni plating layer and an electrolytic Ag plating layer. In this case, it is difficult to form the electrolytic Ag plating layer with a thin and uniform film thickness, and thus the Ni plating layer as an underlayer may be exposed or pinholes of the electrolytic Ag plating layer may be generated. In order to suppress the exposure of the underlayer Ni plating layer and the generation of the pinholes, it is necessary to form the electrolytic Ag plating layer to have a film thickness thicker than necessary, and thus manufacturing cost increases.

When the underlayer Ni plating layer is exposed, ESR increases due to oxidation of a surface thereof. Further, there may be a case that the pinholes generated by the electrolytic Ag plating may affect electrical characteristics and oxygen barrier properties of the electrolytic capacitor. The present disclosure provides a highly reliable electrolytic capacitor with reduced ESR.

[Electrolytic Capacitor]

An electrolytic capacitor according to an exemplary embodiment of the present disclosure includes capacitor elements each including an anode part and a cathode part, an exterior body that seals the capacitor elements, first external electrodes that are electrically connected to the anode parts, and second external electrodes that are electrically connected to the cathode parts.

At least one of an end face of the anode part or an end face of the cathode part of the capacitor element is exposed from the exterior body to be electrically connected to a corresponding one of the first external electrode or the second external electrode. That is, the end face of the anode part exposed from the exterior body can be electrically connected to the first external electrode, and/or the end face of the cathode part exposed from the exterior body can be electrically connected to the second external electrode. In a case where the end face of only one of the anode part or the cathode part of the capacitor element is exposed from the exterior body, the end face of another one of the anode part or the cathode part may be connected to a lead-out terminal such as a lead frame inside the exterior body.

The end face of the anode part and/or the cathode part exposed from the exterior body is covered with an electroless Ni plating layer. The electroless Ni plating layer is covered with an electroless Ag plating layer. The electroless Ag plating layer is covered with the first external electrode or the second external electrode. The electroless Ni plating layer and the electroless Ag plating; layer constitute a contact layer for ensuring electrical connection between the end face and the external electrode. The reliability of the electrolytic capacitor can be enhanced by interposing the contact layer.

In a case where Ag plating of the end face is performed by electroplating, it is difficult to form the electrolytic Ag plating layer with a thin and uniform film thickness. In the electrolytic Ag plating, a dummy ball is usually used for ensuring conductivity and stirring. In this case, when the dummy ball is not in contact with a plating portion, plating does not proceed due to a non-energized state. Hence, at this time, a surface of the Ni plating layer is oxidized, and ESR is likely to increase and adhesion strength of the plating layer is likely to decrease. Further, the electrolytic Ag plating is likely to generate pinholes. In addition, in the electrolytic Ag plating, since the plating layer is also formed on a surface of the dummy ball, the amount of silver used increases, and thus manufacturing cost tends to increase. In order to suppress the exposure of the Ni plating layer as an underlayer and the generation of the pinholes, it is necessary to form the electrolytic Ag plating layer to have a film thickness thicker than necessary, and thus the amount of silver used increases.

In contrast, by forming the Ag plating layer by electroless plating, the thickness of the plating layer can be easily controlled so that a thin and uniform plating layer can be formed. Oxidation of the surface of the electroless Ni plating layer due to the exposure of the electroless Ni plating layer as the underlayer and the formation of the pinholes are suppressed. As a result, the ESR of the electrolytic capacitor is reduced, and the electrolytic capacitor with excellent reliability is obtained. Further, the electroless Ag plating layer is hardly deposited on a surface of the exterior body from which the end face is exposed. That is, even though the electroless Ni plating layer is accidentally formed on the surface of the exterior body, more electroless Ag plating layers are formed on the end face of the anode part or the cathode part. That is, since the electroless Ag plating layer can be selectively formed on the surface of the electroless Ni plating layer rather than the surface of the exterior body from which the end face is exposed, the amount of silver used can be reduced. Furthermore, since the electroless Ag plating layer forms a denser film than the electrolytic Ag plating layer, adhesion between the plating layer and the external electrode is improved, and electrical characteristics and oxygen barrier properties as an electrolytic capacitor are improved.

Note that whether or not the Ni plating layer is an electrolytic Ni plating layer or an electroless Ni plating layer, and whether or not the Ag plating layer is an electrolytic Ag plating layer or an electroless Ag plating layer can be specified by analyzing components other than plating metal contained in the plating layer.

The first external electrode and/or the second external electrode may include a conductive paste layer and a Ni/Sn plating layer that covers the conductive paste layer. The Ni/Sn plating layer is a layer containing Ni and Sn, and includes, for example, two layers of a Ni plating layer and a Sn plating layer formed on the Ni plating layer. In the Ni/Sn plating layer, an alloy layer of Ni and Sn may be formed by diffusing Ni of the Ni plating layer to the Sn plating layer and diffusing Sn of the Sn plating layer to the Ni plating layer. At least one external electrode of the first external electrode or the second external electrode, which covers the electroless Ag plating layer, may include the conductive paste layer and the Ni/Sn plating layer. By interpose the conductive paste layer between the electroless Ag plating layer and the external electrode, adhesion between the electroless Ag plating layer and the external electrode is improved, and thus ESR can be remarkably reduced.

The electroless Ni plating layer may contain a phosphorus (P) and/or a boron (B) resulting from a reducing agent (sodium hypophosphite, dimethylamine-borane, or the like) added to a plating bath. In the electroless Ni plating layer, the plating layer can contain the phosphorus (P), for example, in a proportion ranging from 0.1 mass % to 10 mass %, inclusive, and the boron (B), for example, in a proportion ranging from 0.1 mass % to 5 mass %, inclusive. In particular, phosphorus (P) is included in the electroless Ni plating layer, and thus, corrosion resistance and oxidation resistance are improved.

The electroless Ni plating layer may be essentially consisting of Ni. Here, the phrase "the electroless Ni plating layer is essentially consisting of Ni" means that a proportion of elements other than Ni occupying the electroless Ni plating layer is less than 0.1 mass %. In this case, although it takes time for plating, a dense plating layer with excellent corrosion resistance is obtained, and an effect of reducing the ESR is large. Note that the proportion of the element in each plating layer is obtained by, for example, an electron probe microanalyzer (EPMA).

A thickness of the electroless Ni plating layer ranges preferably from 0.1 µm to 10 µm, inclusive. When the thickness of the electroless Ni plating layer is more than or equal to 0.1 µm, a plating layer with a uniform thickness can be formed. The end face of the cathode part or the anode part is not covered with the electroless Ni plating layer in a partial region, and the exposure of the end face is suppressed. When the thickness of the electroless Ni plating layer is less than or equal to 10 µm, a decrease in productivity due to an increase in the thickness of the plating layer can be suppressed.

Similarly, the thickness of the electroless Ag plating layer ranges preferably from 0.1 to 1 µm, inclusive. When the thickness of the electroless Ag plating layer is more than or equal to 0.1 µm, a plating layer with a uniform thickness can be formed. The exposure of the electroless Ni plating layer as the underlayer is suppressed in a partial region. Further, when the thickness of the electroless Ag plating layer is less than or equal to 1 µm, it is possible to suppress the decrease in the productivity due to the increase in the thickness of the Ag plating layer, and it is possible to suppress an increase in the manufacturing cost due to an increase in the amount of Ag used.

Note that the thickness of the plating layer is obtained by arbitrarily selecting ten or more portions on the end face based on a cross-sectional image of the end face and calculating an average thickness.

An adhesion improving layer may be disposed between the electroless Ni plating layer and the electroless Ag plating layer. The adhesion improving layer is formed on the electroless Ni plating layer, and can improve the adhesion of the electroless Ag plating layer. The adhesion improving layer can be formed by, for example, strike Ag plating. The strike Ag plating can be formed by electroless plating or electrolytic plating. Since uniform film formation can be performed by controlling a chemical solution concentration and reaction conditions, it is preferable to form the film by electroless plating.

The electrolytic capacitor may have an element stacked body including a plurality of capacitor elements. In this case, at least one of the end face of the anode part or the end face of the cathode part of each of the plurality of capacitor elements is exposed from the exterior body to be electrically connected to a corresponding one of the first external electrode or the second external electrode via the electroless Ni plating layer and the electroless Ag plating layer. That is, in a case where the exposed end face is the end face of the anode part, the anode part at the end face can be electrically connected to the first external electrode via the electroless Ni plating layer and the electroless Ag plating layer. In a case where the exposed end face is the end face of the cathode part, the cathode part at the end face can be electrically connected to the second external electrode via the electroless Ni plating layer and the electroless Ag plating layer. The plurality of capacitor elements may face the same orientation or may face different orientations from each other. For example, the plurality of capacitor elements may be stacked such that the anode parts or the cathode parts may be alternately face in opposite directions, or the anode parts or the cathode parts may face in opposite directions in any order.

As a configuration of the electrolytic capacitor, only the end face of the anode part may be exposed from the exterior body and may be electrically connected to the first external electrode, only the end face of the cathode part may be exposed from the exterior body and may be electrically connected to the second external electrode, or both the end face of the anode part and the end face of the cathode part may be exposed from the exterior body and may be electrically connected to the first external electrode and the second external electrode, respectively. The electroless Ni plating layer and the electroless Ag plating layer are formed to cover at least one of the exposed end face of the anode part or the exposed end face of the cathode part. The end face of the anode part may be electrically connected to the first external electrode via the electroless Ni plating layer and the electroless Ag plating layer, the end face of the cathode part may be electrically connected to the second external electrode via the electroless Ni plating layer and the electroless Ag plating layer, or both the end face of the anode part and the end face of the cathode part may be electrically connected to respective the first external electrode and the second external electrode via the electroless Ni plating layer and the electroless Ag plating layer. Further, the adhesion improving layer may be disposed between the electroless Ni plating layer and the electroless Ag plating layer.

In a case where the electrolytic capacitor includes the element stacked body such that the end faces of the anode parts of the plurality of capacitor elements may be exposed from the exterior body to be electrically connected to the first external electrode, the end faces of the anode parts may be exposed on the first principal surface of the exterior body. The end face of the anode part can be electrically connected to the first external electrode via the electroless Ni plating layer and the electroless Ag plating layer. The first external electrode can be disposed to cover the first principal surface. Alternatively, the adhesion improving layer is disposed between the electroless Ni plating layer and the electroless Ag plating layer.

Alternatively, in the case where the electrolytic capacitor includes the element stacked body so that the end faces of the anode parts of the plurality of capacitor elements are exposed from the exterior body to be electrically connected to the first external electrode, the end face of the anode part of at least one first capacitor element may be exposed on the first principal surface of the exterior body, and the end face of the anode part of at least one second capacitor element other than the at least one first capacitor element may be exposed on a second principal surface opposite to the first principal surface of the exterior body. Each of the end face of the anode part of the first capacitor element and the end face of the second capacitor element can be electrically connected to the first external electrode via the electroless Ni plating layer and the electroless Ag plating layer. In this case, two first external electrodes arranged apart from each other are provided, one first external electrode is disposed to cover the first principal surface to be electrically connected to the first capacitor element, and the other first external electrode is disposed to cover the second principal surface to be electrically connected to the second capacitor element. At this time, the adhesion improving layer may be disposed between the electroless Ni plating layer and the electroless Ag plating layer.

Further, the cathode part may include a cathode foil. In this case, the end face of the cathode foil may be exposed from the exterior body to be electrically connected to the second external electrode via the electroless Ni plating layer and the electroless Ag plating layer. Note that, in a case where an element stacked body including a plurality of capacitor elements is employed, the cathode foil may be provided in at least one of the plurality of capacitor elements.

Figure 2:
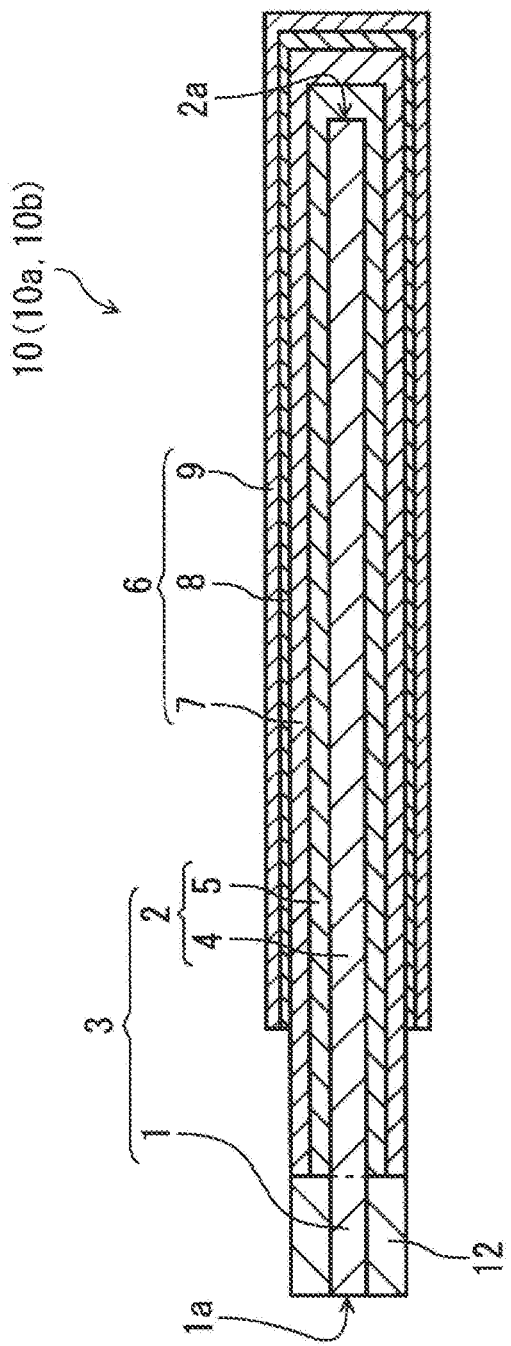
FIG. 2 is a cross-sectional view schematically illustrating a structure of a capacitor element constituting the electrolytic capacitor.

FIG. 1 is a cross-sectional view schematically illustrating a structure of an electrolytic capacitor according to an exemplary embodiment of the present disclosure. FIG. 2 is a cross-sectional view illustrating a structure of a capacitor element constituting the electrolytic capacitor in FIG. 1. However, the electrolytic capacitor according to the present disclosure is not limited thereto.

As illustrated in FIG. 1, electrolytic capacitor 100 includes a plurality of capacitor elements, exterior body 14 that seals the capacitor elements, first external electrode 21, and second external electrode 22. The plurality of capacitor elements are stacked to form an element stacked body.

As illustrated in FIG. 2, capacitor element 10 includes anode body 3 as an anode part, and cathode part 6. Anode body 3 is, for example, a foil (anode foil). Anode body 3 has porous part 5 on a surface thereof, and a dielectric layer (not illustrated) is formed on at least a part of a surface of porous part 5. Cathode part 6 covers at least a part of the dielectric layer. Cathode part 6 includes solid electrolyte layer 7, a cathode lead-out layer, and cathode foil 20.

In capacitor element 10, one end (first end) 1a is not covered with cathode part 6. Anode body 3 is exposed, whereas other end (second end) 2a is covered with cathode part 6. Hereinafter, a portion of anode body 3 not covered with the cathode part is referred to as first portion 1, and a portion of anode body 3 covered with the cathode part is referred to as second portion 2. An end of first portion 1 is first end 1a, and an end of second portion 2 is second end 2a. The dielectric layer is formed on a surface of porous part 5 formed at least in second portion 2. Note that, first portion 1 of anode body 3 is also referred to as an anode lead portion. Second portion 2 of anode body 3 is also called a cathode forming portion.

More specifically, second portion 2 has core part 4 and porous part (porous body) 5 formed on a surface of core part 4 by roughening (etching or the like) or the like in the cathode forming part. On the other hand, first portion 1 may have porous part 5 on the surface thereof or may not have the porous part on the surface thereof. The dielectric layer is formed along the surface of porous part 5. At least a part of the dielectric layer covers an inner wall surface of a hole of porous part 5 and is formed along the inner wall surface.

Cathode part 6 includes solid electrolyte layer 7 that covers at least a part of the dielectric layer and a cathode lead-out layer that covers at least a part of solid electrolyte layer 7. An irregularity shape corresponding to a shape of a surface of anode body 3 are formed on a surface of the dielectric layer. Solid electrolyte layer 7 can be formed to fill such irregularities of such dielectric layer. The cathode lead-out layer includes, for example, carbon layer 8 that covers at least a part of solid electrolyte layer 7 and silver-paste layer 9 that covers carbon layer 8. The cathode lead-out layer may be only carbon layer 8 that covers at least a part of solid electrolyte layer 7.

Cathode foil 20 is interposed between the cathode lead-out layers of adjacent capacitor elements 10 in a stacking direction of the element stacked body. Cathode foil 20 constitutes a part of cathode part 6, and is shared between adjacent capacitor elements 10 in the stacking direction of the element stacked body. An adhesive layer having conductivity may be interposed between cathode foil 20 and capacitor element 10. The adhesive layer is made of conductive adhesive, for example. The adhesive layer includes, for example, silver. Alternatively, the adhesive layer contains, for example, carbon.

Note that, a portion of anode body 3 where solid electrolyte layer 7 is formed on anode body 3 with the dielectric layer (porous part 5) interposed therebetween is second portion 2, and a portion of anode body 3 where solid electrolyte layer 7 is not formed on anode body 3 with the dielectric layer (porous part 5) interposed therebetween is first portion 1.

In a region of anode body 3 not facing cathode part 6, insulating separation layer (or insulator member) 12 can be formed at least in a portion adjacent to cathode part 6 to cover the surface of anode body 3. Consequently, contact between cathode part 6 and an exposed portion (first portion 1) of anode body 3 is restricted. For example, separation layer 12 is an insulating resin layer.

Exterior body 14 has a substantially rectangular parallelepiped outer shape, and electrolytic capacitor 100 also has a substantially rectangular parallelepiped outer shape. Exterior body 14 has first surface 14a and second surface 14b opposite to first surface 14a. In the element stacked body, first end 1a of capacitor element 10 is exposed on first surface 14a. Further, end faces 20a of cathode foil 20 are exposed from the exterior body on second surface 14b. Each of the end faces of cathode foil 20 exposed from exterior body 14 is electrically connected to second external electrode 22 extending along second surface 14b.

In electrolytic capacitor 100, each of a plurality of first ends 1a (first portions) exposed from exterior body 14 is electrically connected to first external electrode 21 extending along first surface 14a. In this case, it is not necessary to bundle the plurality of first portions 1 to form an anode of the electrolytic capacitor, and it is not necessary to secure a length for bundling the plurality of first portions 1. Thus, a proportion of the first portions occupying in the anode body can be reduced to increase a capacitance as compared with a case where the plurality of first portions are bundled. Further, the contribution of ESR and ESL by the first portion is reduced.

End faces of the plurality of first ends 1a exposed from exterior body 14 and the plurality of end faces 20a of cathode foil 20 exposed from exterior body 14 are each covered with contact layer 15. The first end 1a is electrically connected to first external electrode 21 via contact layer 15. Cathode foil 20 is electrically connected to second external electrode 22 via contact layer 15.

Figure 3A:
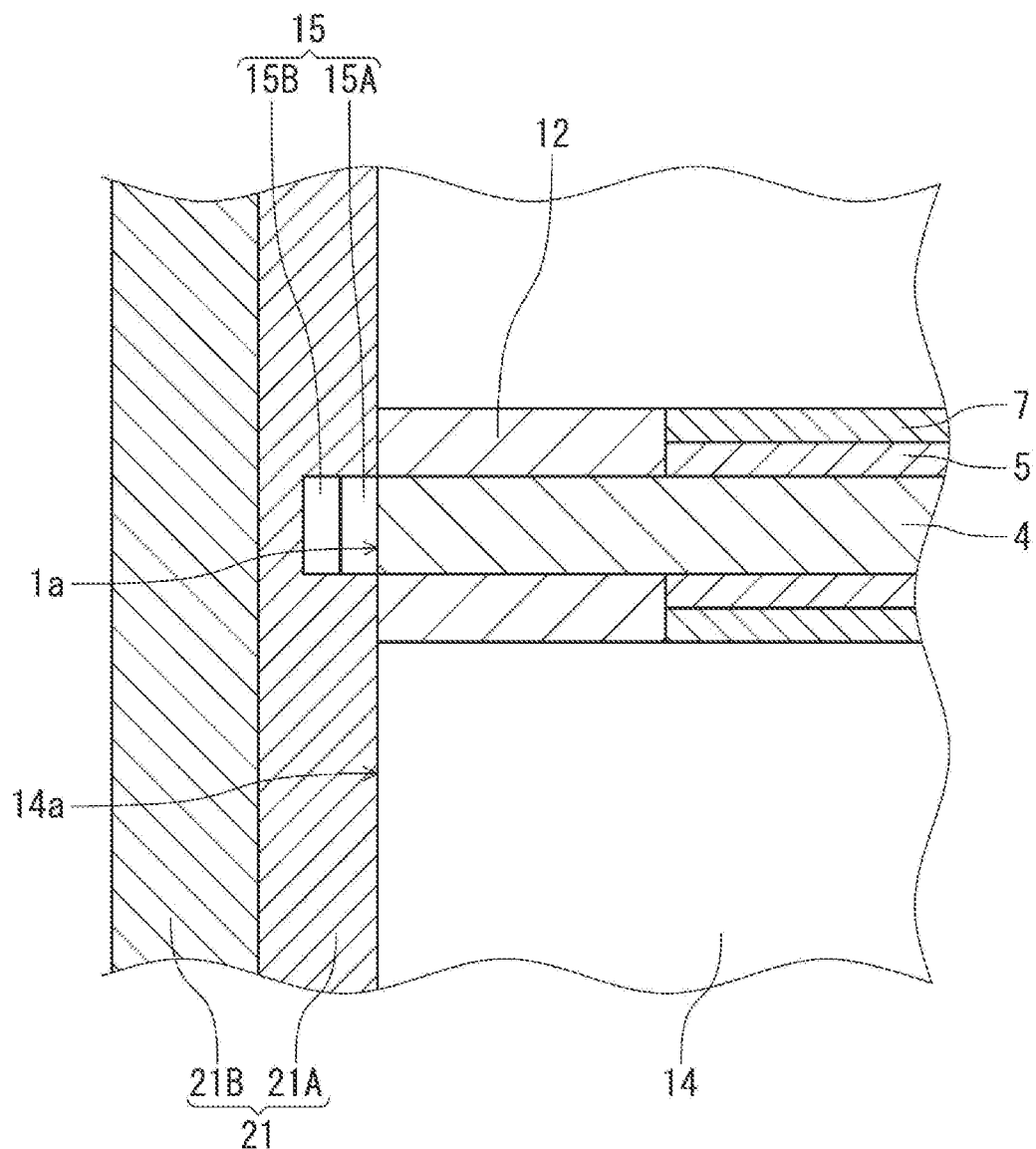
FIG. 3A is a schematic cross-sectional view illustrating a part of a structure of the electrolytic capacitor illustrated in FIG. 1 in an enlarged manner.
Figure 3B:
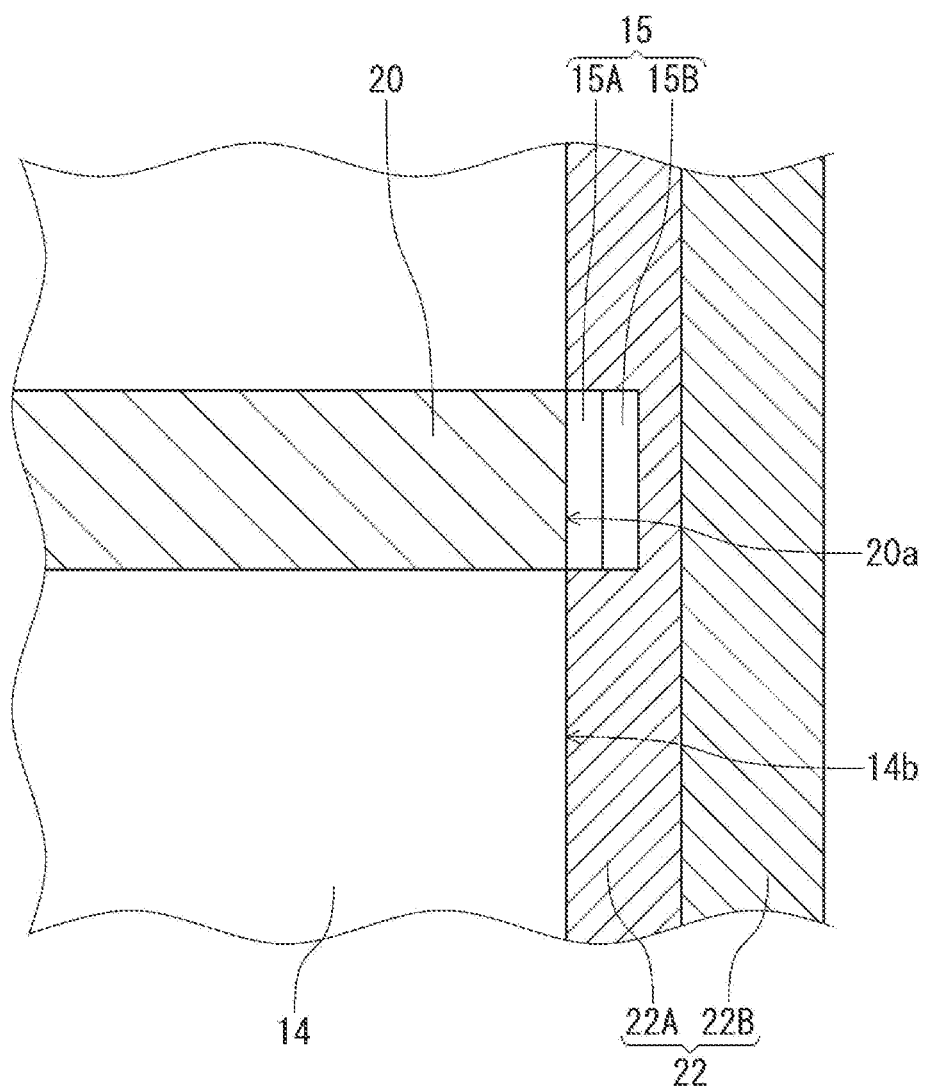
FIG. 3B is a schematic cross-sectional view illustrating a part of the structure of the electrolytic capacitor illustrated in FIG. 1 in an enlarged manner.

FIGS. 3A and 3B are schematic cross-sectional views in which a part of a structure of electrolytic capacitor 100 is enlarged. FIG. 3A is an enlarged cross-sectional view of a region near a connecting part between first end 1a of capacitor element 10 and first external electrode 21 in FIG. 1, and FIG. 3B is an enlarged cross-sectional view of a region near a connecting part between cathode foil 20 and second external electrode 22. Contact layer 15 includes electroless Ni plating layer 15A and electroless Ag plating layer 15B.

As illustrated in FIG. 3A, electroless Ni plating layer 15A covers the end face of first end 1a, and electroless Ag plating layer 15B covers electroless Ni plating layer 15A. In FIG. 3A, electroless Ag plating layer 15B is covered with first external electrode 21. Similarly, as illustrated in FIG. 3B, electroless Ni plating layer 15A covers the end face of cathode foil 20, and electroless Ag plating layer 15B covers electroless Ni plating layer 15A. In FIG. 3B, electroless Ag plating layer 15B is covered with second external electrode 22.

The electroless Ag plating layer that covers the electroless Ni plating layer is formed, and thus, a thickness of the electroless Ag plating layer can be easily controlled. As a result, a uniform and thin plating layer can be formed. Thus, oxidation due to exposure of the electroless Ni plating layer as an underlayer and formation of pinholes in the Ag plating layer can be suppressed while the amount of silver used is reduced. As a result, ESR of the electrolytic capacitor is reduced, and an electrolytic capacitor with excellent reliability at low cost is obtained. Although not illustrated, an adhesion improving layer may be disposed between the electroless Ni plating layer and the electroless Ag plating layer.

First external electrode 21 includes silver-paste layer 21A and Ni/Sn plating layer 21B. Silver-paste layer 21A covers contact layer 15 (electroless Ag plating layer 15B) that covers the end face of first end 1a and first surface 14a of exterior body 14. Ni/Sn plating layer 21B covers silver-paste layer 21A. Second external electrode 22 includes silver-paste layer 22A and Ni/Sn plating layer 22B. Silver-paste layer 22A covers contact layer 15 that covers the end face of cathode foil 20 and second surface 14b of exterior body 14. Ni/Sn plating layer 22B covers silver-paste layer 22A.

In FIGS. 1 and 3A, the end face of first end 1a is flush with first surface 14a. Further, in FIGS. 1 and 3B, end face 20a of cathode foil 20 is flush with second surface 14b. However, the end face of first end 1a and end face 20a of cathode foil 20 are not necessarily flush with a principal surface of exterior body 14, and the end face of first end 1a may protrude or be recessed with respect to first surface 14a. Similarly, end face 20a of cathode foil 20 may protrude or be recessed with respect to second surface 14b.

In FIG. 3A, electroless Ni plating layer 15A and electroless Ag plating layer 15B may also cover an end face of separation layer 12 exposed from first surface 14a. Further, in FIG. 3A, porous part 5 may extend to first surface 14a. In this case, electroless Ni plating layer 15A and electroless Ag plating layer 15B may be formed to cover porous part 5 exposed from first surface 14a.

The element stacked body is supported by substrate 17. The substrate is, for example, an insulating substrate, and may be a metal substrate or a printed substrate provided with a wiring pattern as long as first external electrodes 21 and second external electrode 22 can be electrically separated from each other. The cathode foil may be disposed between substrate 17 and the cathode lead-out layer positioned on a lowermost surface of the element stacked body, substrate 17 is, for example, a stacked substrate in which conductive wiring patterns are formed on a front surface and a back surface thereof, and the wiring pattern on the front surface and the wiring pattern on the back surface may be electrically connected by a through-hole. The wiring pattern on the front surface can be electrically connected to cathode part 6 of the capacitor element stacked body on a lowermost layer, and the wiring pattern on the back surface can be electrically connected to a third external electrode (not illustrated). In this case, thus, the third external electrode is electrically connected to cathode part 6 of each capacitor element of the element stacked body with substrate 17 interposed therebetween. In this case, the third external electrode (cathode) can be arbitrarily arranged in a central region of a bottom surface of the electrolytic capacitor depending on the wiring pattern on the back surface. For example, ESL can be reduced by arranging the third external electrode close to the first external electrode.

substrate 17 is a metal plate, and may have a lead frame structure in which a metal plate processed into a predetermined shape is bent. A part of the metal plate is exposed from the exterior body to be electrically connected to the external terminal at an exposed portion.

A part of first external electrode 21 is bent along a bottom surface of exterior body 14 and is exposed at the bottom surface of electrolytic capacitor 100, For example, a part of second external electrode 22 is bent along the bottom surface of exterior body 14 to face a bent portion of first external electrode 21, and is exposed at the bottom surface of electrolytic capacitor 100. The exposed portions of first external electrode 21 and second external electrode 22 at the bottom surface constitute an anode terminal and a cathode terminal of the electrolytic capacitor.

Figure 4:
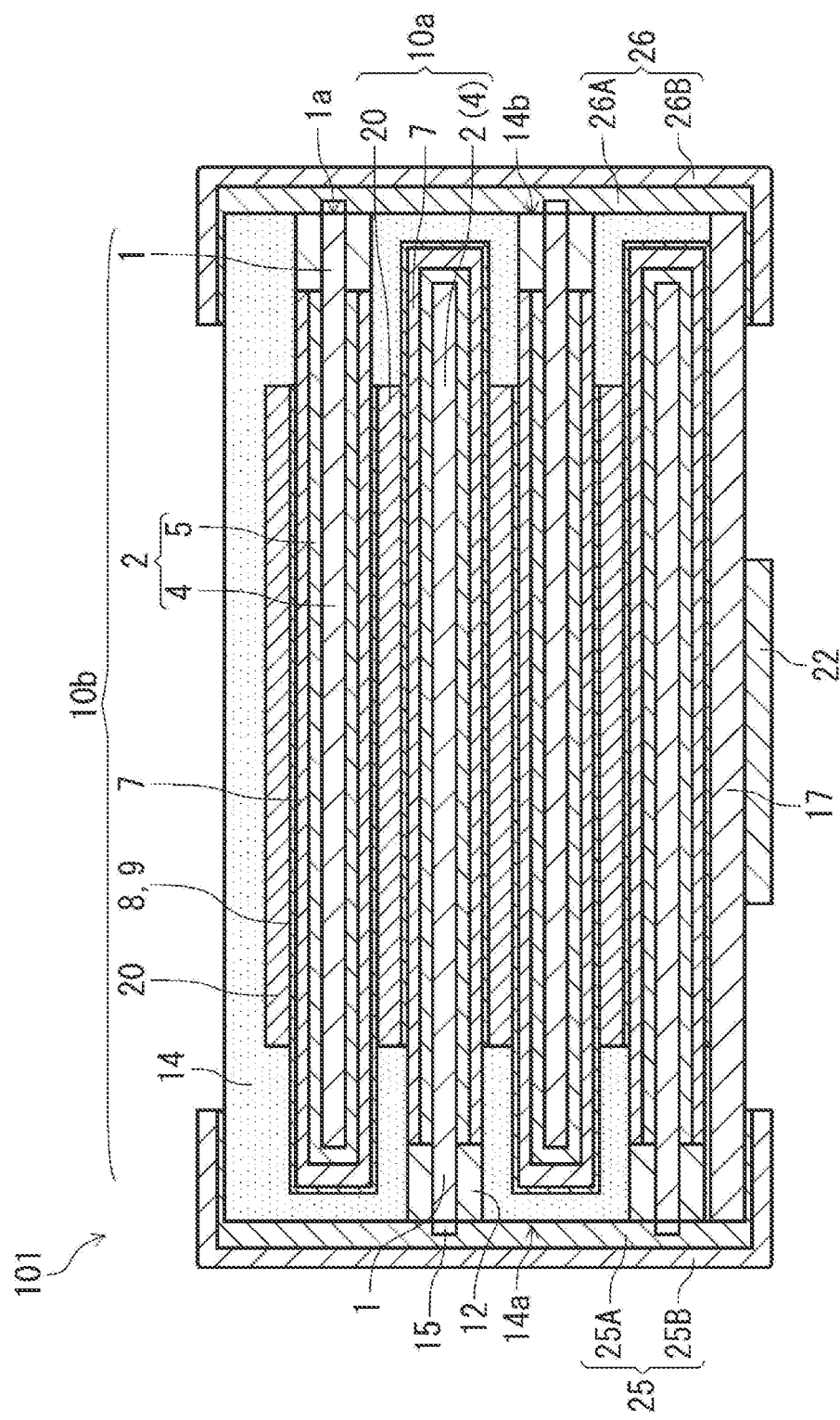
FIG. 4 is a cross-sectional view schematically illustrating another example of the structure of the electrolytic capacitor according to the exemplary embodiment of the present disclosure.

FIG. 4 is a cross-sectional view schematically illustrating another example of the structure of the electrolytic capacitor according to the exemplary embodiment of the present disclosure. Electrolytic capacitor 101 illustrated in FIG. 4 includes a plurality of capacitor elements, exterior body 14 that seals the capacitor elements, first external electrodes 25 and 26, and second external electrode 22. The plurality of capacitor elements are stacked to form an element stacked body. First external electrodes 25 and 26 are arranged apart from each other, first external electrode 25 covers first surface 14a of exterior body 14, and first external electrode 26 covers second surface 14b of exterior body 14.

The plurality of capacitor elements include first capacitor element 10a in which first portion 1 of anode body 3 faces one direction (direction facing first surface 14a of exterior body 14) with respect to second portion 2, and second capacitor element 10b in which first portion 1 of anode body 3 faces a direction opposite to first capacitor element 10a (direction facing second surface 14b of exterior body 14) with respect to second portion 2. First end 1a of first capacitor element 10a is exposed from the exterior body on first surface 14a to be electrically connected to first external electrode 25 via contact layer 15, First end 1a of second capacitor element 10b is exposed from the exterior body on second surface 14b to be electrically connected to first external electrode 26 via contact layer 15. On the other hand, although not illustrated, in a third surface intersecting with first surface 14a and second surface 14b and/or a fourth surface opposite to the third surface, an end face of cathode foil 20 is exposed from exterior body 14 to be electrically connected to second external electrode 22 via contact layer 15.

Similar to electrolytic capacitor 100 illustrated in FIG. 1, although not illustrated, contact layer 15 includes an electroless Ni plating layer that covers an end face of first end 1a or an end face of cathode foil 20, and an electroless Ag plating layer that covers the electroless Ni plating layer. Consequently, the electroless Ag plating layer can be formed to be thin and uniform in thickness, and oxidation due to exposure of the electroless Ni plating layer as an underlayer and formation of pinholes in the Ag plating layer can be suppressed while the amount of silver used is reduced. As a result, ESR of the electrolytic capacitor is reduced, and an electrolytic capacitor with excellent reliability at low cost is obtained. Although not illustrated, an adhesion improving layer may be disposed between the electroless Ni plating layer and the electroless Ag plating layer.

Similar to the electrolytic capacitor 100 illustrated in FIG. 1, first external electrode 25 (26) includes silver-paste layer 25A (26A) that covers contact layer 15 (electroless Ag plating layer), and Ni/Sn plating layer 25B (26B) that covers the silver-paste layer. Similarly, although not illustrated, second external electrode 22 includes silver-paste layer that covers contact layer 15 (electroless Ag plating layer) and a Ni/Sn plating layer that covers the silver-paste layer.

In electrolytic capacitor 101, first capacitor element 10a and second capacitor element 10b are different from each other in an orientation in which a current flows in the elements. Thus, since an orientation of a magnetic field generated by the current is different, a magnetic flux generated in the element stacked body decreases. Consequently, ESL can be reduced. Preferably, the first surface and the second surface may be surfaces of the exterior body facing each other.

In the example of FIG. 4, in the element stacked body, first capacitor element 10a and second capacitor element 10b may be alternately stacked. However, the stacking of first capacitor elements 10a, and second capacitor elements 10b is not necessarily be alternate lamination, and a part of the element stacked body may have a portion where first capacitor elements 10a are stacked adjacent to each other and/or a portion where second capacitor elements 10b are stacked adjacent to each other. Since the magnetic flux generated in the element stacked body is effectively reduced and the ESL is effectively reduced, it is preferable that the first capacitor elements and the second capacitor elements are alternately stacked.

In electrolytic capacitors 100 and 101, a known plating method can be used as a method for forming the electroless Ni plating layer, the electroless Ag plating layer, the adhesion improving layer (strike Ag plating layer), and the Ni/Sn plating layer.

Hereinafter, the constituent elements of the electrolytic capacitor according to the exemplary embodiment are described in detail.

(Anode Body)

The anode body can include a valve metal, an alloy containing a valve metal, a compound containing a valve metal (such as an intermetallic compound), and the like. These materials can be used singly or in combination of two or more types thereof. As the valve metal, aluminum, tantalum, niobium, titanium, or the like may be used. The anode body may be a foil of a valve metal, an alloy containing a valve metal, or a compound containing a valve metal, or may be a porous sintered body of a valve metal, an alloy containing a valve metal, or a compound containing a valve metal.

In a case where a metal foil is used for the anode body, the porous part is usually formed on the surface of at least the second portion of the anode foil in order to increase the surface area. The second portion includes the core part and the porous part formed on the surface of the core part. The porous part may be formed by roughening the surface of at least the second portion of the anode foil by etching or the like. A roughening treatment such as an etching treatment can be performed after a predetermined masking member is arranged on the surface of the first portion. On the other hand, it is also possible to perform the roughening treatment on the entire surface of the anode foil by the etching treatment or the like. In the former case, an anode foil having no porous part on the surface of the first portion and having a porous part on the surface of the second portion is obtained. In the latter case, the porous part is formed not only on the surface of the second portion but also on the surface of the first portion. The etching treatment is performed by using a known technique, such as electrolytic etching. The masking member is not particularly limited, but an insulator such as resin is preferable. The masking member may be a conductor containing a conductive material, which needs to be removed before the formation of the solid electrolyte layer.

In a case where the roughening treatment is performed on the entire surface of the anode foil, the porous part is provided on the surface of the first portion. Thus, adhesion between the porous part and the exterior body is not sufficient, and air (specifically, oxygen and moisture) intrudes into the electrolytic capacitor through a contact portion between the porous part and the exterior body in some cases. In order to suppress such entrance, the first portion formed to be porous may be compressed in advance to crush pores of the porous part. Consequently, it possible to suppress the intrusion of air into the electrolytic capacitor through the porous part from the first end exposed from the exterior body, and to suppress a decrease in reliability of the electrolytic capacitor due to the intrusion of the air.

(Dielectric Layer)

The dielectric layer is formed by anodizing the valve metal of the surface of at least the second portion of the anode body by an anodizing treatment or the like. The dielectric layer contains an oxide of the valve metal. For example, the dielectric layer in a case where aluminum is used as the valve metal contains aluminum oxide. The dielectric layer is formed at least along the surface of the second portion (including the inner wall surface of the pore of the porous part) where the porous part is formed. Note that, however, a method for forming the dielectric layer is not limited thereto. Any method can be used as long as an insulating layer functioning as a dielectric can be formed on the surface of the second portion. The dielectric layer may also be formed on the surface of the first portion (for example, on the porous part of the surface of the first portion).

(Cathode Part)

The cathode part includes the solid electrolyte layer that covers at least a part of the dielectric layer and the cathode lead-out layer that covers at least a part of the solid electrolyte layer. The cathode part may include the cathode foil. The cathode foil is electrically connected to the cathode lead-out layer and electrically connected to the cathode terminal with the cathode foil interposed therebetween, and thus, the electrical connection between the cathode lead-out layer and the cathode terminal is facilitated.

(Solid Electrolyte Layer)

The solid electrolyte layer contains a conductive polymer, for example. As the conductive polymer, for example, polypyrrole, polythiophene, polyaniline, derivatives thereof, and the like may be used. For example, the solid electrolyte layer can be formed by polymerizing raw material monomers on the dielectric layer through chemical polymerization and/or electrolytic polymerization. Alternatively, the solid electrolyte layer can be formed by applying a solution in which the conductive polymer is dissolved or a dispersion in which the conductive polymer is dispersed to the dielectric layer. The solid electrolyte layer may contain a manganese compound.

(Cathode Lead-Out Layer)

The cathode lead-out layer includes, for example, the carbon layer and the silver-paste layer. The carbon layer can have conductivity, and is made of, for example, a conductive carbon material, such as graphite. The carbon layer is formed, for example, by applying a carbon paste to at least a part of the surface of the solid electrolyte layer. For the silver-paste layer, a composition containing a silver powder and a binder resin (epoxy resin or the like) can be used, for example. The silver-paste layer is formed by applying a silver paste to a surface of the carbon layer, for example. Note that the configuration of the cathode lead-out layer is not limited thereto, and may be any configuration having a current collecting function.

(Cathode Foil)

The cathode foil is, for example, a metal foil, and may be a sintered foil, a vapor deposited foil, or a coated foil. The cathode foil may be a sintered foil, a vapor deposited foil, or a coated foil obtained by covering a surface of a metal foil (for example, Al foil or Cu foil) with a conductive film by vapor deposition or coating. The vapor deposited foil may be an Al foil with Ni that is vapor-deposited on the surface. Examples of the conductive film include Ti, TiC, TiO, and C (carbon) films. The conductive film may be a carbon coating film.

(Separation Layer)

In order to electrically separate the first portion and the cathode part, an insulating separation layer may be provided. The separation layer can be provided close to the cathode part to cover at least a part of the surface of the first portion. The separation layer is preferably in close contact with the first portion and the exterior body. Consequently, it possible to suppress the intrusion of air into the electrolytic capacitor. The separation layer may be disposed on the first portion with the dielectric layer interposed therebetween.

The separation layer contains, for example, resin, and the materials exemplified for the exterior body to be described later can be used. The dielectric layer formed in the porous part of the first portion may be compressed and densified to provide insulation.

The separation layer in close contact with the first portion is obtained, for example, by bonding a sheet-like insulator member (resin tape or the like) to the first portion. In a case where the anode foil having the porous part on the surface thereof is used, the porous part of the first portion may be compressed and flattened, and then the insulator member may be brought into close contact with the first portion. The sheet-like insulator member preferably has an adhesive layer on the surface on a side to be bonded to the first portion.

Further, a liquid resin may be applied to or immersed into the first portion to form an insulator member in close contact with the first portion. In the method using the liquid resin, the insulator member is formed to fill the irregularities on the surface of the porous part of the first portion. The liquid resin easily intrudes into recesses on the surface of the porous part, and the insulator member can be easily formed also in the recesses. A curable resin composition exemplified in a fourth step to be described later can be used as the liquid resin.

(Exterior Body)

The exterior body preferably contains, for example, a cured product of a curable resin composition, and may contain a thermoplastic resin or a composition containing the thermoplastic resin.

The exterior body can be formed by using a molding technique such as injection molding. The exterior body can be formed, for example, by using a predetermined mold and filling a predetermined portion with a curable resin composition or a thermoplastic resin (composition) to cover the capacitor elements.

The curable resin composition may contain a filler, a curing agent, a polymerization initiator, a catalyst, and/or the like, in addition to the curable resin. A thermosetting resin is exemplified as the curable resin. The curing agent, the polymerization initiator, the catalyst, and the like are appropriately selected in accordance with a type of the curable resin.

Materials exemplified in the fourth step to be described later can be used as the curable resin composition and the thermoplastic resin (composition).

From the viewpoint of adhesion between the separation layer and the exterior body, each of the insulator member and the exterior body preferably contains a resin. The exterior body is easily in close contact with the insulator member containing the resin as compared with the first portion containing the valve metal and the dielectric layer containing the oxide of the valve metal.

The separation layer and the exterior body more preferably contain the same resin. In this case, the adhesion between the separation layer and the exterior body improves, and the intrusion of air into the electrolytic capacitor is further suppressed. Examples of the same resin contained in the separation layer and the exterior body include an epoxy resin.

From the viewpoint of enhancing the strength and the like of the exterior body, the exterior body preferably contains a filler.

On the other hand, the separation layer preferably contains a filler having a particle size smaller than the exterior body, and more preferably does not contain a filler. In a case where the liquid resin is immersed into the first portion to form the separation layer, the liquid resin preferably contains a filler having a particle size smaller than the exterior body, and more preferably does not contain a filler. In this case, the liquid resin is easily immersed into a deep portion of the recess on the surface of the porous part of the first portion, and the separation layer is easily formed. Further, it is easy to form a separation layer having a small thickness such that a plurality of capacitor elements can be stacked.

(Contact Layer)

The contact layer includes the electroless Ni plating layer and the electroless Ag plating layer, and can be formed to cover the end face of the first end of the anode body and/or the end face of the cathode foil. Preferably, the contact layer may be selectively formed to cover only the surface of the first end exposed from the exterior body and the surface of the cathode foil without covering the surface of the exterior body (and the separation layer) which is the resin material as much as possible. In order to enhance the adhesion of the electroless plating layer and to easily form the electroless Ni plating layer and the electroless Ag plating layer selectively on the surface of the first end exposed from the exterior body and the surface of the cathode foil, it is preferable to perform a zincate treatment before the formation of the electroless Ni plating layer. Further, the adhesion improving layer may be formed between the electroless Ni plating layer and the electroless Ag plating layer by strike Ag plating. The adhesion of the electroless Ag plating layer can be improved by forming the adhesion improving layer.

(External Electrode)

The first external electrode and/or the second external electrode preferably include the metal layer. The metal layer is a plating layer, for example. The metal layer may contain, for example, at least one selected from the group consisting of nickel (Ni), copper (Cu), zinc (Zn), tin (Sn), silver (Ag), and gold (Au). To make the metal layer, a film forming technique, such as electroplating, electroless plating, sputtering, vacuum deposition, chemical vapor deposition (CVD), cold spraying, or thermal spraying, may be used.

The first external electrode and/or the second external electrode may have, for example, a stacked structure of a Ni layer and a tin layer. At least an outer surface of each of the first external electrode and/or the second external electrode may be metal having excellent wettability with solder. Examples of such a metal include Sn, Au, Ag, and Pd.

The first external electrode and/or the second external electrode preferably include a stacked structure of a conductive paste layer and a plating layer. The plating layer may be a Ni/Sn plating layer from the viewpoint of excellent wettability with solder.

(Conductive Paste Layer)

The conductive paste layer is formed to cover the principal surface of the exterior body and to be electrically connected to the first end(s) of the (plurality of) capacitor element(s) and/or the cathode foil via the contact layer.

The conductive paste layer includes a conductive resin layer mixed with conductive particles. The conductive resin layer can be formed by applying a conductive paste containing conductive particles and a resin material to the principal surface of the exterior body and drying the paste. The resin material is suitable for adhesion between the exterior body and the contact layer, and can increase joining strength by chemical bonding (for example, hydrogen bonding). For example, metal particles such as silver and copper, or particles of a conductive inorganic material such as carbon can be used as the conductive particles.

The conductive paste layer may cover a part of a surface (for example, an upper surface or a bottom surface) intersecting with the first end of the capacitor element and/or the principal surface of the exterior body from which the cathode foil is exposed.

[Method for Manufacturing Electrolytic Capacitor]

An electrolytic capacitor according to an exemplary embodiment of the present disclosure can be manufactured by, for example, a manufacturing method including a first step of preparing an anode body, a second step of obtaining a plurality of capacitor elements, a third step of obtaining an element stacked body in which the plurality of capacitor elements are stacked, a fourth step of covering the element stacked body with an exterior body, a fifth step of forming an end face of a first portion and exposing the end face from the exterior body, and a sixth step of electrically connecting the end face of the first portion to a first external electrode. The manufacturing method may further include a step of disposing a separation layer (insulator member) on a part of the anode body (separation layer arrangement step).

Hereinafter, each step of a method of manufacturing an electrolytic capacitor will be described.

(First Step)

In a first step, an anode body having a dielectric layer formed on the surface thereof is prepared. More specifically, an anode body including a first portion including one end and a second portion including the other end opposite to one end and having a dielectric layer formed on at least a surface of the second portion is prepared. The first step includes, for example, a step of forming a porous part on the surface of the anode body, and a step of forming a dielectric layer on the surface of the porous part. More specifically, the anode body used in the first step has a first portion including a removal scheduled end (the one end) and a second portion including a second end (the other end). A porous part is preferably formed on at least the surface of the second portion.

When the porous part is formed on the surface of the anode body, the irregularities may be formed on the surface of the anode body, and, for example, the surface of the anode foil may be roughened by etching (for example, electrolytic etching) or the like.

The dielectric layer may be formed by performing an anodizing treatment on the anode body. The anodizing treatment can be performed, for example, by immersing the anode body in an anodizing liquid to impregnate the surface of the anode body with the anodizing liquid, and applying a voltage between the anode body as an anode, and a cathode immersed in the anodizing liquid. In a case where the porous part is provided on the surface of the anode body, the dielectric layer is formed along the irregularity shape of the surface of the porous part.

(Separation Layer Arrangement Step)

In a case where the electrolytic capacitor including the separation layer (insulator member) is manufactured, a step of arranging the separation layer (insulator member) may be performed after the first step and before the second step. In this step, the insulator member is disposed on a part of the anode body. More specifically, in this step, the insulator member is disposed on the first portion of the anode body with the dielectric layer interposed therebetween. The insulator member separates the first portion and the cathode part formed in a later step.

In the separation layer arrangement step, a sheet-like insulator member (resin tape or the like) may be bonded to a part (for example, the first portion) of the anode body. Even in a case where the anode body in which the porous part is formed on the surface is used, the insulator member can be firmly in close contact with the first portion by compressing and flattening the irregularities on the surface of the first portion. The sheet-like insulator member preferably has an adhesive layer on the surface on a side to be bonded to the first portion.

In addition to the above, in the separation layer arrangement step, a part (for example, the first portion) of the anode body may be applied or immersed with the liquid resin to form the insulator member. For example, the liquid resin may be applied or immersed, and then cured. In this case, the insulator member in close contact with the first portion can be easily formed. The curable resin composition exemplified in the fourth step (the formation of the exterior body), the resin solution obtained by dissolving a resin in a solvent, or the like can be used as the liquid resin.

In a case where the porous part is formed on the surface of the anode body, it is preferable to apply or immerse a part (for example, the surface of the first portion) of the surface of the porous part of the anode body with the liquid resin. In this case, the insulator member can be easily formed to fill the irregularities on the surface of the porous part of the first portion. The liquid resin easily intrudes into recesses on the surface of the porous part, and the insulator member can be easily formed also in the recesses. Consequently, since the porous part on the surface of the anode body is protected by the insulator member, collapse of the porous part of the anode body is suppressed when the anode body is partially removed together with the exterior body in the fourth step. Since the surface of the porous part of the anode body and the insulator member are firmly in close contact with each other, peeling of the insulator member from the surface of the porous part of the anode body is suppressed when the anode body is partially removed together with the exterior body in the fourth step.

(Second Step)

In a second step, the cathode part is formed on the anode body to obtain the capacitor element. In a case where the insulator member is provided in the first step, the cathode part is formed in a portion of the anode body where the insulator member is not disposed in the second step to obtain a capacitor element. More specifically, in the second step, at least a part of the dielectric layer formed on the surface of the second portion of the anode body is covered with the cathode part.

A step of forming the cathode part include, for example, a step of forming a solid electrolyte that covers at least a part of a dielectric, and a step of forming a cathode lead-out layer that covers at least a part of a solid electrolyte layer.

For example, the solid electrolyte layer can be formed by polymerizing raw material monomers on the dielectric layer through chemical polymerization and/or electrolytic polymerization. In addition, to make the solid electrolyte layer may be formed by applying a treatment liquid containing a conductive polymer to the dielectric layer and then drying the treatment liquid. The treatment liquid may further contain another component such as a dopant. A polymerization liquid containing pyrrole (monomer of a conjugated polymer), naphthalenesulfonic acid (dopant), and water are prepared as the conductive polymer. Electrolytic polymerization is performed by using the obtained polymerization liquid.

The cathode lead-out layer can be formed by, for example, sequentially stacking a carbon layer and a silver-paste layer on the solid electrolyte layer.

(Third Step)

In a third step, the plurality of capacitor elements are stacked to obtain the element stacked body. The element stacked body may be Obtained by sandwiching the cathode foil between the capacitor elements. In the element stacked body, the orientations of the first portions of the plurality of capacitor elements may be the same or different. The cathode parts of the plurality of capacitor elements may be alternately overlapped with each other with the conductive adhesive interposed therebetween such that the first portion faces the opposite side between adjacent capacitor elements to obtain the element stacked body.

Thereafter, the element stacked body is placed on the substrate with the conductive adhesive interposed therebetween. The substrate may be the insulating substrate, or may be the metal substrate or the stacked substrate in which the wiring patterns are formed on the front surface and the back surface. In a case where the stacked substrate is used, the third external electrode may be formed in advance on the side of the stacked substrate opposite to the side on which the element stacked body is placed. When placed, the third external electrode is electrically connected to the cathode part of the capacitor element constituting the element stacked body with the wiring patterns formed on the multilayer substrate and the through-hole connecting the wiring pattern on the surface and the wiring pattern on the back surface interposed therebetween.

In addition, for example, the element stacked body and the lead terminal may be electrically connected by bonding the plate-shaped external lead terminal bent into a predetermined shape to the surface of the cathode part exposed in the lowermost layer or the uppermost layer of the element stacked body with the conductive paste or the like interposed therebetween.

(Fourth Step)

In a fourth step, the element stacked body is covered with the exterior body. In a case where the third external electrode is provided, the entire third external electrode is not covered with the exterior body, and at least a part of the third external electrode is exposed. The exterior body can be formed by injection molding or the like. The exterior body can be formed, for example, by using a predetermined mold and filling a predetermined portion with the curable resin composition or the thermoplastic resin (composition) to cover the element stacked body.

The curable resin composition may contain a filler, a curing agent, a polymerization initiator, a catalyst, and/or the like, in addition to the curable resin. Examples of the curable resin include epoxy resin, phenol resin, urea resin, polyimide, polyamide-imide, polyurethane, diallyl phthalate, and unsaturated polyester. Examples of the thermoplastic resin include polyphenylene sulfide (PPS) and polybutylene terephthalate (PBT), A thermoplastic resin composition containing a thermoplastic resin and a filler may be used.

As the filler, for example, insulating particles and/or fibers are preferable. Examples of an insulating material that constitutes the filler include insulating compounds (oxides, and the like) such as silica and alumina, glass, and mineral materials (talc, mica, clay, and the like). The exterior body may contain one type of these fillers, or may contain two or more types of these fillers in combination.

(Fifth Step)

In a fifth step, after the fourth step, the end faces of the first portions are formed and exposed from the exterior body. More specifically, at least the anode body is partially removed together with the exterior body on the end side of the element stacked body to expose at least the first end (specifically, the end face of the first end) of the anode body from the exterior body. A method for exposing the first end from the exterior body includes, for example, covering the capacitor element with the exterior body, and then grinding the surface of the exterior body or cutting off a pail of the exterior body to expose the first end from the exterior body. In addition, a part of the first portions may be separated from a part of the exterior body. In this case, the first end which does not include the porous part and has a surface on which a natural oxide film is not formed can be more easily exposed than the exterior body, and a highly reliable connection state where resistance is small between the first portion and the external electrode is obtained. Preferably, the exterior body is cut by dicing. Consequently, the exposed end faces of the first ends of the first portions appear on cut surfaces. At least one of the cut surfaces is a first surface. Note that, in a case where the element stacked body includes two kinds of capacitor elements in which the orientations of the first portions are different from each other, it is necessary to cut a part of the first portion at two places when the part of the first portion is separated from a part of the exterior body. One of two cut surfaces is a first surface, and the other is a second surface.

In a case where the element stacked body includes the cathode foil, the cathode foil is partially removed together with the exterior body to expose the end of the cathode foil from the exterior body. Similar to a method for exposing the end of the cathode foil from the exterior body, the same method as the method for exposing the first end of the anode body from the exterior body can be used. The exposed surface of the end of the cathode foil from the exterior body is preferably a surface different from the surface of the exterior body from which the first end of the anode body is exposed. Note that the shapes of the anode body and the cathode foil are appropriately designed, and thus, the end of the cathode foil and the first end of the anode body can be exposed at different positions on the surface of the same exterior body.

In the fifth step, on the end side of the element stacked body, the anode body and the insulator member may be partially removed together with the exterior body to expose the end face of the first end and the end face of the insulator member from the exterior body. In this case, the anode body and the insulator member are formed with flush end faces exposed from the exterior body. Consequently, each of the end face of the anode foils and the end face of the insulator member, which are flush with the side surface of the exterior body can be easily exposed from the exterior body.

In the fifth step, the end face and the end face of the cathode foil) of the anode body (first end) on which the natural oxide film is not formed can be easily exposed from the exterior body, and a highly reliable connection state with low resistance can be obtained between the anode body (more specifically, the first portion) and the external electrode.

(Sixth Step)

In a sixth step, the end face of the anode body (first end) exposed from the exterior body is electrically connected to the first external electrode. In this step, for example, the first external electrode is formed to cover the exposed surface of the first end of the exterior body, and the first external electrode is electrically connected to the end face of the first end. For example, in a case where the end faces of the anode body (first end) are exposed on the first surface and the second surface, the first external electrode that covers the first surface and the first external electrode that covers the second surface can be formed apart from each other. In addition, in a case where the element stacked body includes the cathode foil, the end face of the cathode foil exposed from the exterior body is electrically connected to the second external electrode. For example, the second external electrode is formed to cover the exposed surface of the cathode foil of the exterior body, and the second external electrode is electrically connected to the end face of the cathode foil. The first external electrode and/or the second external electrode include, for example, the conductive paste layer and the Ni/Sn plating layer that covers the conductive paste layer.

Prior to the formation of the first and second external electrodes, a step of forming the contact layer on the surface which is the end face of the first end and/or the end face of the cathode foil is performed. The step of forming the first and second external electrodes may include a step of forming the conductive paste layer to cover the end face of the first end and/or the principal surface of the exterior body from which the end face of the cathode foil is exposed. In a case where the contact layer is formed, the conductive paste layer can be formed to cover the principal surfaces of the contact layer and the exterior body.

(Step of Forming Contact Layer)

The contact layer is preferably formed by plating. The contact layer preferably includes two layers of the electroless Ni plating layer and the electroless Ag plating layer that covers the electroless Ni plating layer. Consequently, the uniform and thin electroless Ag plating layer can be formed, and the oxidation due to the exposure of the electroless Ni plating layer as the underlayer and the formation of the pinholes in the Ag plating layer can be suppressed while the amount of silver used is reduced. As a result, ESR of the electrolytic capacitor is reduced, and an electrolytic capacitor with excellent reliability at low cost is obtained. A known method may be used as a specific method of plating, such as components of a plating bath used for electroless Ni plating and electroless Ag plating.

The electroless Ni plating layer and the electroless Ag plating layer are formed to selectively cover the end face of the first end and/or the end face of the cathode foil and not to cover the exposed portion of the resin of the exterior body as much as possible. In order to enhance the selectivity of the electroless Ni plating layer, a zincate treatment may be performed before electroless Ni plating. The electroless Ag plating layer can be selectively formed on the surface of the electrolytic Ni plating layer. In addition, the adhesion improving layer may be formed between the electroless Ni plating layer and the electroless Ag plating layer by strike Ag plating. The adhesion of the electroless Ag plating layer can be improved by forming the adhesion improving layer.

(Step of Forming Conductive Paste Layer)

The conductive paste layer can be formed to cover the end face of the first end and/or the end face of the cathode foil (the contact layer in a case where the contact layer is formed) and cover the exposed surface of the exterior body from which the end face of the first end and/or the end face of the cathode foil are exposed and the end face of the separation layer (insulator member) in a case where the separation layer is provided.

The conductive paste layer can be formed by applying the conductive paste containing the conductive particles and the resin material. Specifically, the conductive paste layer is formed by applying the conductive paste (for example, the silver paste) to each end face by a dipping method, a transfer method, a printing method, a dispensing method, or the like, and then curing the paste at a high temperature.

In order to produce an electrolytic capacitor similar to electrolytic capacitor 100 illustrated in FIG. 1, the element stacked body was obtained by stacking the capacitor element having the carbon layer formed as the cathode lead-out layer, and the cathode foil with the conductive adhesive interposed therebetween. Electrolytic capacitor X0 for evaluation was obtained by covering the element stacked body with the exterior body and executing steps up to the fifth step of the manufacturing method. The end face of the anode body and the end face of the cathode foil exposed from the exterior body of electrolytic capacitor X0 were connected to a resistance measurement device, and a resistance value at 100 kHz was evaluated as an ESR value. The ESR of electrolytic capacitor X0 was 0.18 mΩ.

Subsequently, electrolytic capacitor VA for evaluation was obtained by forming the contact layer composed of the electroless Ni—P plating layer (thickness: 5 µm) and the electroless Ag plating layer (thickness: 0.3 µm) on the end face of the anode body and the end face of the cathode foil of electrolytic capacitor X0. Here, the electroless Ni—P plating layer refers to a layer in which phosphorus (P) is contained in the electroless Ni plating layer. The contact layer of electrolytic capacitor X1A was connected to the resistance measurement device, and ESR was measured in the same manner. The ESR of electrolytic capacitor X1A was 0.21 mΩ.

Subsequently, electrolytic capacitor X2A for evaluation was obtained by covering the contact layer of electrolytic capacitor X1A with the silver-paste layer to form the first external electrode and the second external electrode. The first external electrode and the second external electrode of electrolytic capacitor X2A were connected to the resistance measurement device, and ESR was measured in the same manner. The ESR of electrolytic capacitor X2A was 1.21 mΩ, and a sufficiently low ESR was obtained.

Subsequently, electrolytic capacitor X1B for evaluation was obtained by forming the contact layer including the electroless Ni—P plating layer (thickness: 5 pin), the adhesion improving layer by electroless strike Ag plating, and the electroless Ag plating layer (thickness: 0.3 µm) on the end face of the anode body and the end face of the cathode foil of electrolytic capacitor X0. The contact layer of electrolytic capacitor X1B was connected to the resistance measurement device, and ESR was measured in the same manner. The ESR of electrolytic capacitor X1B was 0.21 mΩ.

Subsequently, electrolytic capacitor X2B for evaluation was obtained by covering the contact layer of electrolytic capacitor X1B with the silver-paste layer to form the first external electrode and the second external electrode. The first external electrode and the second external electrode of electrolytic capacitor X2B were connected to the resistance measurement device, and ESR was measured in the same manner. The ESR of electrolytic capacitor X2B was 1.21 mΩ, and a sufficiently low ESR was obtained.

Variation (σ) in product ESR of electrolytic capacitor X2A for evaluation was 2.570, variation (σ) in product ESR with electrolytic capacitor X2B for evaluation was 1.813, and it was confirmed that variation (σ) in the product ESR was suppressed by arranging the adhesion improving layer.

Subsequently, electrolytic capacitor X1C for evaluation was obtained by forming the contact layer including the electroless Ni—B plating layer (thickness: 5 µm) and the electroless Ag plating layer (thickness: 0.3 µm) was formed on the end face of the anode body and the end face of the cathode foil of electrolytic capacitor X0. Here, the electroless Ni—B plating layer refers to an electroless Ni plating layer containing boron (B). The contact layer of electrolytic capacitor X1C was connected to the resistance measurement device, and ESR was measured in the same manner. The ESR of electrolytic capacitor X1C was 0.19 mΩ.

Subsequently, electrolytic capacitor X2C for evaluation was obtained by covering the contact layer of electrolytic capacitor X1C with the silver-paste layer to form the first external electrode and the second external electrode. The first external electrode and the second external electrode of electrolytic capacitor X2C were connected to the resistance measurement device, and ESR was measured in the same manner. The ESR of electrolytic capacitor X2C was 122 mΩ, and a sufficiently low ESR was obtained.

On the other hand, electrolytic capacitor Y1 (comparative example) for evaluation was obtained by forming the contact layer composed of the electroless Ni plating layer (thickness: 5 µm) and the electrolytic Ag plating layer (thickness: 1 µm) on the end face of the anode body and the end face of the cathode foil of electrolytic capacitor X0. The contact layer of electrolytic capacitor Y1 was connected to the resistance measurement device, and ESR was measured in the same manner. The ESR of electrolytic capacitor Y1 was 0.28 mΩ, and was increased as compared with electrolytic capacitors X1A, X1B, and X1C.

Electrolytic capacitor Y2 (comparative example) for evaluation was obtained by covering the contact layer of electrolytic capacitor Y1 with the silver-paste layer to form the first external electrode and the second external electrode. The first external electrode and the second external electrode of electrolytic capacitor Y2 were connected to the resistance measurement device, and ESR was measured in the same manner. The ESR of electrolytic capacitor Y2 was 1.95 mΩ, and was significantly increased as compared with electrolytic capacitors X2A, X2B, and X2C.

The electrolytic capacitor according to the present disclosure can be used for various applications in which high capacitance and low ESR are required.

The invention claimed is:

1. An electrolytic capacitor comprising:
a capacitor element that includes an anode part and a cathode part;
an exterior body that seals the capacitor element;
a first external electrode that is electrically connected to the anode part; and
a second external electrode that is electrically connected to the cathode part,
wherein:
at least one of an end face of the anode part or an end face of the cathode part is exposed from the exterior body to be electrically connected to a corresponding one of the first external electrode or the second external electrode,
the end face exposed from the exterior body is covered with an electroless Ni plating layer,
the electroless Ni plating layer is covered with an electroless Ag plating layer,
the electroless Ag plating layer is covered with the corresponding one of the first external electrode or the second external electrode, and
a thickness of the electroless Ag plating layer ranges from 0.1 μm to 1 μm, inclusive.

2. The electrolytic capacitor according to claim 1, wherein at least one of the first external electrode or the second external electrode includes a conductive paste layer and a Ni/Sn plating layer that covers the conductive paste layer.

3. The electrolytic capacitor according to claim 1, wherein the electroless Ag plating layer is selectively disposed on a surface of the electroless Ni plating layer rather than a surface of the exterior body from which the end face is exposed.

4. The electrolytic capacitor according to claim 1, wherein an adhesion improving layer is disposed between the electroless Ni plating layer and the electroless Ag plating layer.

5. The electrolytic capacitor according to claim 1, wherein the electroless Ni plating layer contains at least one of a phosphorus (P) or a boron (B).

6. The electrolytic capacitor according to claim 1, wherein the electroless Ni plating layer is essentially consisting of Ni.

7. The electrolytic capacitor according to claim 1, wherein a thickness of the electroless Ni plating layer ranges from 0.1 μm to 10 μm, inclusive.

8. The electrolytic capacitor according to claim 1, the electrolytic capacitor comprising an element stacked body that includes a plurality of capacitor elements each being the capacitor element,
wherein at least one of an end face of the anode part or an end face of the cathode part of each of the plurality of capacitor elements in the element stacked body is exposed from the exterior body to be electrically connected to a corresponding one of the first external electrode or the second external electrode via the electroless Ni plating layer and the electroless Ag plating layer.

9. The electrolytic capacitor according to claim 8, wherein the end face of the anode part of each of the plurality of capacitor elements is exposed on a first principal surface of the exterior body to be electrically connected to the first external electrode via the electroless Ni plating layer and the electroless Ag plating layer.

10. The electrolytic capacitor according to claim 8, wherein:
the end face of the anode part of at least one first capacitor element among the plurality of capacitor elements is exposed on a first principal surface of the exterior body to be electrically connected to the first external electrode via the electroless Ni plating layer and the electroless Ag plating layer, and
the end face of the anode part of at least one second capacitor element other than the at least one first capacitor element is exposed on a second principal surface of the exterior body to be electrically connected to the first external electrode via the electroless Ni plating layer and the electroless Ag plating layer, the second principal surface being opposite to the first principal surface.

11. The electrolytic capacitor according to claim 1, wherein:
the cathode part includes a cathode foil, and
an end face of the cathode foil is exposed from the exterior body to be electrically connected to the second external electrode via the electroless Ni plating layer and the electroless Ag plating layer.

12. An electrolytic capacitor comprising:
a capacitor element that includes an anode part and a cathode part;
an exterior body that seals the capacitor element;
a first external electrode that is electrically connected to the anode part; and
a second external electrode that is electrically connected to the cathode part,
wherein:
at least one of an end face of the anode part or an end face of the cathode part is exposed from the exterior body to be electrically connected to a corresponding one of the first external electrode or the second external electrode via a contact layer,
the contact layer includes an electroless Ni plating layer covering the end face exposed from the exterior body, an adhesion improving layer disposed on the electroless Ni plating layer, and an electroless Ag plating layer disposed on the adhesion improving layer,
the electroless Ag plating layer is covered with the corresponding one of the first external electrode or the second external electrode.

13. The electrolytic capacitor according to claim 12, wherein the adhesion improving layer is a strike plating layer.

14. The electrolytic capacitor according to claim 12, wherein at least one of the first external electrode or the second external electrode includes a conductive paste layer and a Ni/Sn plating layer that covers the conductive paste layer.

15. The electrolytic capacitor according to claim 12, wherein the electroless Ag plating layer is selectively disposed on a surface of the electroless Ni plating layer rather than a surface of the exterior body from which the end face is exposed.

16. The electrolytic capacitor according to claim 12, wherein the electroless Ni plating layer contains at least one of a phosphorus (P) or a boron (B).

17. The electrolytic capacitor according to claim 12, wherein a thickness of the electroless Ni plating layer ranges from 0.1 μm to 10 μm, inclusive.

18. The electrolytic capacitor according to claim 12, wherein a thickness of the electroless Ag plating layer ranges from 0.1 μm to 1 μm, inclusive.

19. The electrolytic capacitor according to claim 12, the electrolytic capacitor comprising an element stacked body that includes a plurality of capacitor elements each being the capacitor element,
- wherein at least one of an end face of the anode part or an end face of the cathode part of each of the plurality of capacitor elements in the element stacked body is exposed from the exterior body to be electrically connected to a corresponding one of the first external electrode or the second external electrode via the contact layer.

20. The electrolytic capacitor according to claim 12, wherein:
- the cathode part includes a cathode foil, and
- an end face of the cathode foil is exposed from the exterior body to be electrically connected to the second external electrode via the contact layer.

* * * * *